US006689630B2

United States Patent
Kordesch et al.

(10) Patent No.: US 6,689,630 B2
(45) Date of Patent: Feb. 10, 2004

(54) METHOD OF FORMING AN AMORPHOUS ALUMINUM NITRIDE EMITTER INCLUDING A RARE EARTH OR TRANSITION METAL ELEMENT

(75) Inventors: Martin E. Kordesch, The Plains, OH (US); Hugh Richardson, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 09/864,853

(22) Filed: May 23, 2001

(65) Prior Publication Data

US 2002/0003284 A1 Jan. 10, 2002

Related U.S. Application Data

(60) Provisional application No. 60/206,540, filed on May 23, 2000.

(51) Int. Cl.[7] .............................................. H01L 21/00
(52) U.S. Cl. .............................. 438/28; 438/35; 438/46
(58) Field of Search ................................ 438/28, 35, 46

(56) References Cited

U.S. PATENT DOCUMENTS

| | | | |
|---|---|---|---|
| 3,979,271 A | | 9/1976 | Noreika et al. |
| 4,616,248 A | | 10/1986 | Khan et al. |
| 4,798,701 A | | 1/1989 | David |
| 4,915,810 A | * | 4/1990 | Kestigian et al. ...... 204/298.04 |
| 4,957,604 A | | 9/1990 | Steininger |

(List continued on next page.)

FOREIGN PATENT DOCUMENTS

| | | | | |
|---|---|---|---|---|
| EP | 0 342 894 | | 11/1989 | |
| EP | 0 996 173 A2 | | 4/2000 | |
| JP | 6 3093860 A | * | 10/1988 | ........... C23C/14/36 |
| JP | 10016112 A | * | 4/1998 | ............. B32B/7/02 |
| WO | WO 99/36968 | | 7/1999 | |

OTHER PUBLICATIONS

Tamara et al., "Fundamental Characteristics of the Illuminating Light Source Using White Light–Emitting Diodes Based on InGaN Semiconductors", Transactions of the Institute of Electrical Engineers of Japan, Part A, vol. 120–A, No. 2, pp. 244–249, Feb. 2000.*

A.F. Belianin et al., "STM Study Electron Field Emission from Mo–Doped AlN Films", Vacuum Microelectronics Conference, Eleventh International, Jul. 19–24, 1998, pp. 228–229.*

Dimitrova, V.I. et al, "Photo–, Cathode–, and Electroluminescence Studies of Sputter Deposited AlN:ER Thin Films", Tenth International Conference on Solid Films and Surfaces, Princetion, NJ, USA, Jul. 9–13, 2000, vol. 175–176, pp. 480–483.

(List continued on next page.)

Primary Examiner—Olik Chaudhuri
Assistant Examiner—William M. Brewster
(74) Attorney, Agent, or Firm—Dinsmore & Shohl LLP

(57) ABSTRACT

A variety of optimal luminescent emitter layers, luminescent devices, and methods of fabricating the same are provided. In accordance with one embodiment of the present invention, an alternating current thin film electroluminescent device is provided including an AC power source and an emitter layer positioned between a pair of electrode layers. One of the pair of electrode layers is transparent to visible light of a selected wavelength. The AC power source is connected across the pair of electrode layers. The emitter layer comprises a non-conductive amorphous alloy comprising aluminum nitride and an Er luminescent center. The emitter layer and the pair of electrode layers are arranged such that, upon activation of the AC power source, an electric field is created between the electrode layers across the emitter layer. The aluminum nitride and the Er luminescent center are provided in proportions selected such that the electric field causes emission of visible light of the selected wavelength from the emitter layer.

45 Claims, 1 Drawing Sheet

U.S. PATENT DOCUMENTS

| | | | |
|---|---|---|---|
| 4,971,928 | A | 11/1990 | Fuller |
| 5,562,781 | A | 10/1996 | Ingram et al. |
| 5,567,647 | A | 10/1996 | Takahashi |
| 5,739,180 | A | 4/1998 | Taylor-Smith |
| 5,834,053 | A | 11/1998 | Dye et al. |
| 5,952,680 | A | 9/1999 | Strite |
| 6,043,602 | A | 3/2000 | Sun et al. |
| 6,072,198 | A | 6/2000 | Sun et al. |
| 6,169,359 | B1 | 1/2001 | Sun et al. |
| 6,255,669 | B1 * | 7/2001 | Birkhahn et al. ............. 257/89 |

OTHER PUBLICATIONS

Yoshida, S. et al, "Cathodoluminscence of Impurity–Doped Aluminum Nitride Films Produced by Reactive Evaporation", vol. 58, No. 1, Mar. 1979, pp. 55–59.

Martin, A.L. et al, "Visible Emission from Amorphous AlN Thin–Film Phosphors with Cu, Mn, or Cr", 47th International Symposium of the American Vacuum Society, Boston, MA, USA, vol. 19, No. 4, pt. 1–2, pp. 1894–1897.

Stumm, P. et al., "Can Amorphous GaN Serve as a Useful Electronic Material?" The American Physical Society, 1997, pp. 677–680.

Caldwell et al., Visible Emission from Thin–Film Phosphors of Amorphous AlN: Cu, Mn, and Cr.; 5 pgs.

Caldwell, M.L. et al., Emission Properties of an Amorphous AlN: Cr3+ Thin–Film Phosphor; Applied Physics Letters; Jan. 2, 2001; pp. 1246–1248; vol. 78, issue 9; American Institute of Physics.

Dimitrova, V.I. et al., Photo–, Cathodo–, and Electroluminescence Studies of Sputter Deposited AlN: Er Thin Films; Applied Surface Science; Oct. 26, 2000; pp 1–4; Elsevier Science B.V.

Dimitrova, V.I., et al., Green Emission from Er–Doped AlN Thin Films Prepared by RF Magnetron Sputtering; Mat. Res. Soc. Sump. Proc.; 2000; Q5.4.1—Q5.4.6; Materials Research Society.

Jadwisienczak, W.M. et al., Luminescence of Tb Ions Implanted Into Amorphous AlN Thin Films Grown by Sputtering; Applied Physics Letters; Apr. 10, 2000; pp 3376–3378; vol. 76, No. 23; American Institute of Physics.

Dimitrova, V.I. et al., Visible Emission from Electroluninescent Devices Using an Amorphous AlN: Er3+ Thin Film Phosphor; Applied Physics Letter; Jul. 24, 2000; pp. 478–479; vol. 77, No. 4; American Institute of Physics.

Caldwell, M.I. et al., Optical Properties of Manganese Doped Amorphous and Crystalline Aluminumn Nitride Films; Symposium W, "Gallium Nitride and Related Alloys"; 1999; 5 pgs; Boston, Massachusetts.

K Gurumurugan et al, Visible cathodoluminescence of Er–doped amorphous AlN thin films, Applied Physics Letters Xp–002158752, vol. 74, No. 20, May 17, 1999, pp. 3008–3010.

Caldwell et al., Optical Properties of Managanese Doped Amorphous and Crystalline Aluminum Nitride Films,http://nsr.mjj.mrs.org/5S1/W3.26/, Apr. 11, 2001.

Carolone et al., J. Appl. Phys. 55 (11), Jun. 1, 1984 American Institute of Physics,pp. 4010–4014.

Azema et al., Plasma–enhanced vapour deposition of AlN (1010) on Si (100): microstructural study of the interlayers, 2300 Journal of Crystal Growth, 129 (1993) Apr., Nos. 3/4, Amersterdam, NL, pp 621–628.

Nakayama Takeshi, Patent Abstracts of Japan, Semiconductor Device and Manufacture Thereof, Copyright: (c) 1998, JPO.

Tamaki Yaji et al., Preparation of AlN and GaN thin films by reactive ion beam sputtering and optical properties, Inst. Phys. Conf. Ser. No. 142: Chapter 5, (c) 1996 IOP Publishing Ltd., pp. 911–914.

Sudhir et al., Control of the Structure and Surface Morphology of Gallium Nitride and Aluminum Nitride Thin Films by Nitrogen Background Pressure in Pulsed Laser Deposition, Journal of Electronic Material, vol. 27, No. 4, 1998, pp. 215–221.

Hong Chen et al., Band gap engineering in amorphous AlxGa10xN: Experiment and ab initio calculations, 2000 American Institute of Physics, http://ojps.aip.org/aplcpyrts.htm., Jan. 22, 2001 pp. 1117–1119.

Dimitrova, V.I., et al., "Green Emission from Er–Doped AlN Thin Films Prepared by RF Magnetron Sputtering", Abstract XP–002196331, Electron–Emission Material, Vacuum Microelectronics and Flat–Panel Displays. Symposium (Materials Research Society Symposium Proceedings vol. 621) Electron–Emissive Materials, Vacuum Microelectronics and Flat–Panel Displays. Symposium, San Francisco, CA, 25–27 Apr. 2000, pg. Q5.4.1–6.

* cited by examiner

METHOD OF FORMING AN AMORPHOUS ALUMINUM NITRIDE EMITTER INCLUDING A RARE EARTH OR TRANSITION METAL ELEMENT

CROSS-REFERENCE TO RELATED APPLICATIONS

This application claims the benefit of U.S. Provisional Application Ser. No. 60/206,540, filed May 23, 2000. This application is also related to U.S. patent application Ser. No. 09/431,339, BAND GAP ENGINEERING OF AMORPHOUS Al—Ga—N ALLOYS, filed Oct. 29, 1999, the disclosure of which is incorporated herein by reference.

STATEMENT REGARDING FEDERALLY SPONSORED RESEARCH OR DEVELOPMENT

This invention was made with government support under Contract Nos. N00014-99-10975 and N00014-96-1-0782 awarded by the Office of Naval Research. The Government has certain rights in this invention.

BACKGROUND OF THE INVENTION

The present invention relates to luminescent emitter layers, luminescent devices, and methods of fabricating the same. Electroluminescent, cathodoluminescent, and photo luminescent emitter layers may be used in a variety of display technology applications. Indeed, a significant amount of research has been devoted to developing thin film luminescent emitter layers. A variety of preferred compositions have been developed. However, despite these technological advances, there is a continuing drive to develop high performing, efficient, inexpensive, and readily producible luminescent emitter layers.

BRIEF SUMMARY OF THE INVENTION

This need is met by the present invention wherein a variety of optimal luminescent emitter layers, luminescent devices, and methods of fabricating the same are provided. In accordance with one embodiment of the present invention, an alternating current thin film electroluminescent device is provided comprising an AC power source and an emitter layer positioned between a pair of electrode layers. One of the pair of electrode layers is transparent to visible light of a selected wavelength. The AC power source is connected across the pair of electrode layers. The emitter layer comprises a non-conductive amorphous alloy comprising aluminum nitride and an Er luminescent center. The emitter layer and the pair of electrode layers are arranged such that, upon activation of the AC power source, an electric field is created between the electrode layers across the emitter layer. The aluminum nitride and the Er luminescent center are provided in proportions selected such that the electric field causes emission of visible light of the selected wavelength from the emitter layer.

In accordance with another embodiment of the present invention, a method of fabricating an alternating current thin film electroluminescent device is provided. According to the method, a non-conductive amorphous film comprising aluminum nitride and an Er luminescent center is prepared by RF magnetron sputtering an Al target and an Er target in a nitrogenous atmosphere, at room temperature, under vacuum. The amorphous film is activated to form an emitter layer by annealing at or above about 1023 K. The emitter layer is positioned between the pair of electrode layers. An AC power source is connected across the pair of electrode layers. The emitter layer and the pair of electrode layers are arranged such that, upon activation of the AC power source, an electric field is created between the electrode layers across the emitter layer. The aluminum nitride and the Er luminescent center are provided in proportions selected such that the electric field causes emission of visible light of the selected wavelength from the emitter layer.

In accordance with yet another embodiment of the present invention, a method of fabricating an amorphous luminescent emitter layer comprising aluminum nitride and a transition metal luminescent center is provided. The emitter layer is fabricated by co-sputtering an Al target and a transition metal target over a deposition surface of a semiconductor substrate so as to form an amorphous AlN:TM film on the deposition surface. The RF magnetron sputtering is performed in a nitrogenous atmosphere, at room temperature, under vacuum. The amorphous film is activated by annealing at or above about 1250 K.

In accordance with yet another embodiment of the present invention, an alternating current thin film electroluminescent device is provided. The ACTFEL device comprises an AC power source and an emitter layer positioned between a pair of electrode layers. At least one of the pair of electrode layers is transparent to visible light of a selected wavelength. The AC power source is connected across the pair of electrode layers. The emitter layer comprises a non-conductive amorphous alloy comprising aluminum nitride and an rare earth luminescent center. The emitter layer and the pair of electrode layers are arranged such that, upon activation of the AC power source, an electric field is created between the electrode layers across the emitter layer. The aluminum nitride and the rare earth luminescent center are provided in proportions selected such that the electric field causes emission of visible light of the selected wavelength from the emitter layer.

In accordance with yet another embodiment of the present invention, a method of fabricating an alternating current thin film electroluminescent device is provided. According to the method, a non-conductive amorphous film emitter layer comprising aluminum nitride and a rare earth luminescent center is prepared by co-sputtering an Al target and a rare earth target in a nitrogenous atmosphere at room temperature under vacuum. The emitter layer is positioned between a pair of electrode layers. An AC power source is connected across the pair of electrode layers. The emitter layer and the pair of electrode layers are arranged such that, upon activation of the AC power source, an electric field is created between the electrode layers across the emitter layer. The aluminum nitride and the rare earth luminescent center are provided in proportions selected such that the electric field causes emission of visible light of the selected wavelength from the emitter layer. The emitter layer may be prepared by maintaining the emitter layer near room temperature, whereby heated activation of the emitter layer is unnecessary.

In accordance with yet another embodiment of the present invention, a method of fabricating an amorphous luminescent emitter layer comprising aluminum nitride and a rare earth luminescent center is provided. According to the method, the emitter layer is prepared by co-sputtering an Al target and a rare earth target over a deposition surface of a substrate so as to form an amorphous AlN:RE film emitter layer on the deposition surface. The co-sputtering is performed in a nitrogenous atmosphere, at room temperature, under vacuum. The emitter layer may be prepared by maintaining the emitter layer near room temperature, whereby heated activation of the emitter layer is unnecessary.

Accordingly, it is an object of the present invention to provide high performing, efficient, inexpensive, and readily producible luminescent emitter layers. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
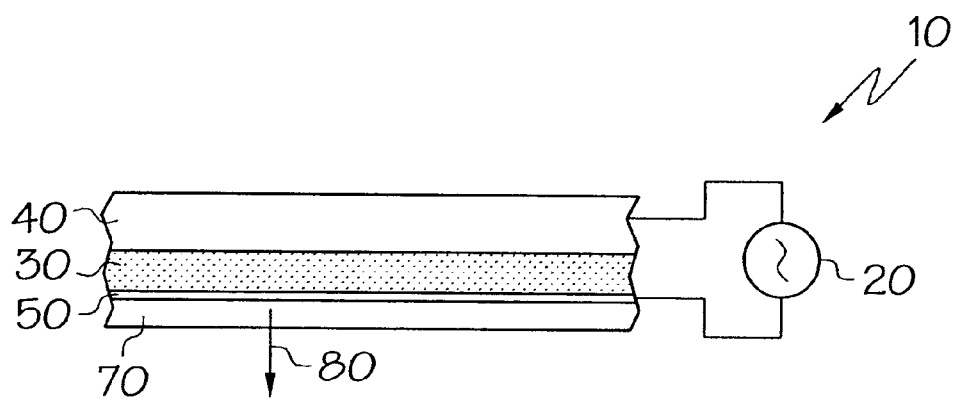
FIGS. 1 and 2 illustrate two alternating current thin film electroluminescent devices according to the present invention.
Figure 2:
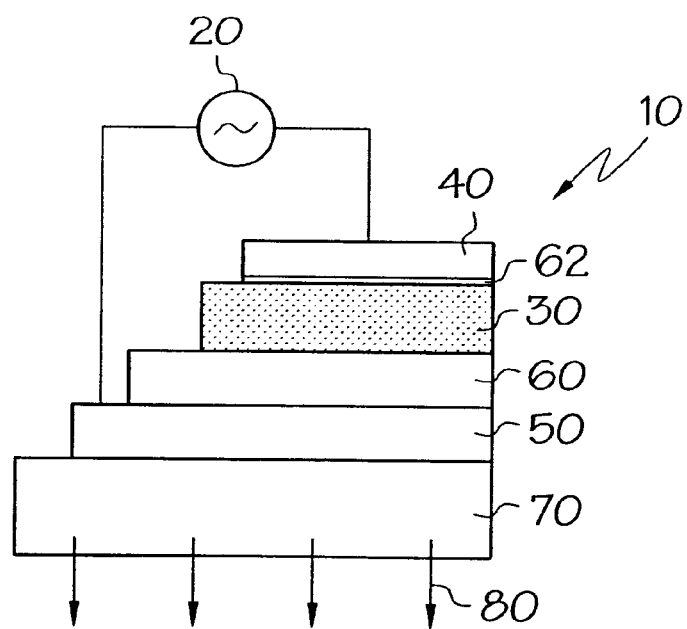

Referring collectively to FIGS. 1 and 2, two alternating current thin film electroluminescent devices 10 according to the present invention are described. The alternating current thin film electroluminescent device 10 comprises an AC power source 20 and an emitter layer 30 positioned between a top electrode layer 40 and a transparent bottom electrode layer 50. The AC power source 20 is connected across the pair of electrode layers 40, 50.

The emitter layer 30 comprises a non-conductive amorphous alloy comprising aluminum nitride and an Er luminescent center. The amorphous nature of the emitter layer 30 is advantageous because the amorphous alloy of the present invention can be grown at room temperature with little stress due to lattice mismatch.

The emitter layer 30 and the pair of electrode layers 40, 50 are arranged such that, upon activation of the AC power source, an electric field is created between the electrode layers 40, 50 across the emitter layer 30. The aluminum nitride and the Er luminescent center are provided in proportions selected such that the electric field across the emitter layer 30 causes emission of visible light 80 of a selected wavelength from the emitter layer 30. Specifically, upon application of the electric field, electrons are injected into the luminescent centers of the emitter layer 30. The injected electrons stimulate emission of electromagnetic radiation from the luminescent centers at a predetermined wavelength. Typically, the electroluminescent device 10 is configured such that emission of visible light 80 is initiated upon generation of between about 2.4 MV/cm and 3.4 MV/cm across the emitter layer 30.

The emitter layer 30 defines a characteristic band gap and the amorphous alloy is characterized by localized electronic states that do not extend into the characteristic band gap. In this manner, non-conductivity of the emitter layer 30 may be preserved. Typically, the emitter layer 30 defines a characteristic band gap of about 5.6 eV but it is noted that the characteristic band gap may be any value between about 5.4 eV and about 6.2 eV.

The emitter layer 30 typically comprises between about 0.5% and about 1%, by weight, of the Er luminescent center, e.g., $Er^{3+}$ ions, and defines a film thickness of about 200 nm. It is contemplated by the present invention that the emitter layer 30 may define a variety of film thicknesses, including thicknesses of between about 50 nm and about 20 im.

The wavelength of electroluminescent emission of the emitter layer 30 is substantially independent of the characteristic band gap of the emitter layer 30. The efficiency of excitation in the emitter layer 30, not the color of emission, is a function of the band gap. As a result, the color of emission of the emitter layer 30 does not vary noticeably.

The top electrode layer may be fabricated from aluminum and may be evaporated directly on the emitter layer 30 in the form of a plurality of aluminum dots (thickness—about 100 nm, area—about 0.085 $cm^2$). The bottom electrode layer 50 is transparent to at least the wavelength of emission and may comprise indium tin oxide having a thickness of about 200 nm. A transparent glass substrate 70 is provided below the bottom electrode layer 50. For the purposes of defining and describing the present invention, it is noted that a layer or material defining optical transmittance of above about 50% in a selected visible wavelength band may be considered transparent. Preferred optical transmittance is at or above the 90% level. For example, the AlN:Er emitter layer according to the present invention may be constructed so as to define an optical transmittance of 98% at 490 nm.

The electroluminescent device 10 may further comprise a dielectric insulating layer 60 disposed between the transparent bottom electrode layer 50 and the emitter layer 30. The dielectric insulating layer 60 should also be transparent to the wavelength of light to be emitted and may comprise aluminum titanium oxide. Typically, the dielectric insulating layer 60 also defines a thickness of about 200 nm. An additional dielectric insulating layer 62 may be provided between the top electrode 40 and the emitter layer 30. Emission of visible light 80 from the emitter layer 30 may be initiated upon application of about 100 VAC across the pair of electrode layers 40, 50. The threshold for emission may be reduced to about 70 VAC by removing the dielectric insulating layer 62. Typically, optimum emission is achieved at potentials above about 70 to 80 VAC and below about 120 to 130 VAC.

The alternating current thin film electroluminescent device 10 may be fabricated through an RF magnetron sputtering process. Initially, a nonconductive amorphous film comprising aluminum nitride and an Er luminescent center is prepared by RF magnetron sputtering an Al target and an Er target in a substantially pure nitrogenous atmosphere at room temperature under vacuum. The amorphous film is activated to form the emitter layer 30 by annealing the amorphous film at or above about 1023 K. The emitter layer 30 is positioned between the pair of electrode layers 40, 50 and the AC power source 20 is connected across the pair of electrode layers 40, 50. The aluminum nitride and the Er luminescent center are provided in proportions selected such that the electric field causes emission of visible light of the selected wavelength from the emitter layer.

Typically, the emitter layer 30 is prepared by sputter deposition over a deposition surface of a glass substrate. Prior to deposition of the emitter layer, the deposition surface of the glass substrate is coated with the transparent electrode layer 50 and the transparent dielectric insulating layer 60. As is noted above, the transparent electrode layer 50 may comprise indium tin oxide and the dielectric insulating layer 60 may comprise aluminum titanium oxide.

Preferably, the nitrogenous atmosphere is substantially pure and the vacuum is less than about $3 \times 10^{-5}$ Torr prior to sputtering and about $6 \times 10^{-4}$ Torr during sputtering. The RF magnetron sputter is characterized by a sputtering power of about 200 W and the emitter layer is sputter deposited at a rate of about 0.05 nm/s at an Er concentration of between about 0.5% and about 1%, by weight. The emitter layer 30 may be activated by annealing in a nitrogenous atmosphere at about 1023 K for about 10 minutes.

The Al target and the Er target may comprise separate targets or combined targets. For example, the Er target may comprise a plug formed in the Al target. Preferably, the Al target and the Er target each exceed 99% purity and, more specifically, the target purity will approach 99.999% for Al and 99.9% for Cr.

An AlN:TM amorphous luminescent emitter layer according to the present invention may be fabricated through RF or DC magnetron sputtering. Specifically, the emitter layer comprises aluminum nitride (Al) and a transition metal luminescent center (TM) and is fabricated by co-sputtering an Al target and a transition metal target over a deposition surface of a semiconductor substrate to form an amorphous AlN:TM film on the deposition surface. The co-sputtering is performed in a nitrogenous atmosphere, at room temperature, under vacuum. The amorphous film is activated by annealing at or above about 1250 K. Preferred annealing temperatures range from about 1250 K to about 1300 K and are held for up to 30 minutes.

Preferably, the semiconductor substrate comprises a p-doped silicon substrate characterized by a 111 crystallographic orientation. Other suitable substrate materials include sapphire, quartz, magnesium oxide, and silicon carbide. It may also be preferable to ensure that the nitrogenous atmosphere is substantially pure and that the vacuum is less than about $3 \times 10^{-5}$ Torr prior to sputtering and about $6 \times 10^{-4}$ Torr during sputtering. The RF magnetron sputter is characterized by a sputtering power of about 200 W and the amorphous film is sputter deposited at a rate of about 0.03 nm/s to about 0.04 nm/s. A film thickness of between about 200 nm and about 230 nm is suitable for the amorphous film.

Where the transition metal luminescent center comprises Cu, the amorphous film is sputter deposited at a Cu concentration of between about 0.1 and about 10 atomic percent. A preferred Cu concentration is about 7.4 atomic percent. Where the transition metal luminescent center comprises Mn, the amorphous film is sputter deposited at a Mn concentration of between about 0.1 and about 10 atomic percent. A preferred Mn concentration is about 1.4 atomic percent. Where the transition metal luminescent center comprises Cr, the amorphous film is sputter deposited at a Cr concentration of between about 0.1 and about 10 atomic percent. Preferred Cr concentrations include about 1.5 and about 3 atomic percent. The Al target and the transition metal target each exceed 99% purity. Other potentially advantageous transition metals include Ni, Co, Fe, V, Ti, and Sc.

An amorphous rare earth luminescent emitter layer according to the present invention may be fabricated through direct current or RF magnetron sputtering. Specifically, the emitter layer comprises aluminum nitride and a rare earth luminescent center. The emitter layer is fabricated by co-sputtering an Al target and a rare earth (RE) target over a deposition surface of a substrate to form an amorphous AlN:RE film on the deposition surface. The co-sputtering is performed in a nitrogenous atmosphere, at room temperature and under vacuum of about $10^{-3}$ Torr to about $10^{-4}$ Torr. For the purposes of describing and defining the present invention, it is noted that a rare earth material (RE) comprises any of the group of chemical elements with atomic numbers 58 to 71. Additionally, it is noted that where reference is made herein to a layer being formed over a surface of a substrate or over another layer, it is contemplated that intervening layers of material may be present between the layer and the surface of the substrate over which the layer is to be formed.

The alternating current thin film electroluminescent devices 10 illustrated in FIGS. 1 and 2 may be described more generally as comprising an emitter layer 30 formed from an amorphous alloy comprising aluminum nitride and a rare earth luminescent center. The rare earth luminescent center may comprise any of the rare earth elements. It is noted that amorphous alloys including the rare earth elements Er and Tb are typically characterized by visible emission in the green portion of the spectrum while amorphous alloys including Nd and Eu are characterized by visible emission in the yellow and yellow-orange portions of the spectrum, respectfully.

Emitter layers 30 formed from an amorphous alloy comprising aluminum nitride and a rare earth luminescent center are particularly advantageous because, in many instances, they may be Conned at room temperature and do not require thermal activation at elevated temperatures. Accordingly, it is not necessary to form such emitter layers over high melting point materials. Rather, such emitter layers may be formed over less costly, readily available organic substrates that typically have melting points well below 10008° C. For example, such emitter layers may be formed over a plastic substrate.

Having described the invention in detail and by reference to preferred embodiments thereof, it will be apparent that modifications and variations are possible without departing from the scope of the invention defined in the appended claims. For example, it is contemplated that the fabrication methods described herein are applicable to a variety of luminescent devices, including ACTFEL devices, cathodoluminescent devices, photo luminescent devices, field emission devices, etc. Although some aspects of the present invention are identified herein as preferred or particularly advantageous, it is contemplated that the present invention is not necessarily limited to these preferred aspects of the invention.

What is claimed is:

1. A method of fabricating an alternating current thin film electroluminescent device by:

preparing a non-conductive amorphous film comprising aluminum nitride and an Er luminescent center by RF magnetron sputtering an Al target and an Er target in a nitrogenous atmosphere at room temperature under vacuum;

activating said amorphous film to form an emitter layer by annealing said amorphous film at or above about 1023 K;

positioning said emitter layer between a pair of electrode layers;

connecting an AC power source across said pair of electrode layers, wherein said emitter layer and said pair of electrode layers are arranged such that, upon activation of said AC power source, an electric field is created between said electrode layers across said emitter layer and wherein said aluminum nitride and said Er luminescent center are provided in proportions selected such that said electric field causes emission of visible light of said selected wavelength from said emitter layer.

2. A method of fabricating an alternating current thin film electroluminescent device as claimed in claim 1 wherein said emitter layer is prepared by sputter deposition over a deposition surface of a glass substrate.

3. A method of fabricating an alternating current thin film electroluminescent device as claimed in claim 1 wherein said emitter layer defines a film thickness of about 200 nm.

4. A method of fabricating an alternating current thin film electroluminescent device as claimed in claim 3 wherein said deposition surface of said glass substrate is coated wit a transparent electrode layer.

5. A method of fabricating an alternating current thin film electroluminescent device as claimed in claim 4 wherein said transparent electrode layer comprises indium tin oxide.

6. A method of fabricating an alternating current thin film electroluminescent device as claimed in claim 5 wherein said transparent electrode layer is further coated with a transparent dielectric insulating layer.

7. A method of fabricating an alternating current thin film electroluminescent device as claimed in claim 6 wherein said dielectric insulating layer comprises aluminum titanium oxide.

8. A method of fabricating an alternating current thin film electroluminescent device as claimed in claim 1 wherein said nitrogenous atmosphere comprises a substantially pure nitrogen atmosphere.

9. A method of fabricating an alternating current thin film electroluminescent device as claimed in claim 1 wherein said vacuum is less than about $3\times10^{-5}$ Ton prior to sputtering and about $6\times10^{-4}$ Torr during sputtering.

10. A method of fabricating an alternating current thin film electroluminescent device as claimed in claim 1 wherein said RE magnetron sputter is characterized by a sputtering power of about 200W.

11. A method of fabricating an alternating current thin film electroluminescent device as claimed in claim 1 wherein said emitter layer is sputter deposited at an Er concentration of about 1%, by weight.

12. A method of fabricating an alternating current thin film electroluminescent device as claimed in claim 1 wherein said emitter layer is sputter deposited at an Er concentration of between about 0.5% and about 10%, by weight.

13. A method of fabricating an alternating current thin film electroluminescent device as claimed in claim 1 wherein said emitter layer is annealed in a nitrogenous atmosphere at about 1023 K for about 10 minutes.

14. A method of fabricating an alternating current thin film electroluminescent device as claimed in claim 1 wherein said Al target and said Er target comprise separate targets.

15. A method of fabricating an alternating current thin film electroluminescent device as claimed in claim 1 wherein said Er target comprises a plug formed in said Al target.

16. A method of fabricating an amorphous luminescent emitter layer comprising aluminum nitride and a transition metal luminescent center by:
   co-sputtering an Al target and a transition metal target over a deposition surface of a semiconductor substrate so as to form an amorphous AlN:TM film on said deposition surface, wherein said RF magnetron sputtering is performed in a nitrogenous atmosphere, at room temperature, under vacuum; and
   activating said amorphous film by annealing at or above about 1250 K.

17. A method of fabricating an amorphous luminescent emitter layer as claimed in claim 6 wherein said semiconductor substrate comprises a p-doped silicon substrate.

18. A method of fabricating an amorphous luminescent emitter layer as claimed in claim 17 wherein said p-doped silicon substrate is characterized by a III crystallographic orientation.

19. A method of fabricating an amorphous luminescent emitter layer as claimed in claim 16 wherein said vacuum is less than about $3\times10^{-5}$ Ton prior to sputtering and about $6\times10^{-4}$ Ton during sputtering.

20. A method of fabricating an amorphous luminescent emitter layer as claimed in claim 16 wherein said RF magnetron sputter is characterized by a sputtering power of about 200W.

21. A method of fabricating an amorphous luminescent emitter layer as claimed in claim 16 wherein said amorphous film is sputter deposited at a rate of about 0.03 nm/s to about 0.04 nm/s.

22. A method of fabricating an amorphous luminescent emitter layer as claimed in claim 16 wherein said amorphous film defines a film thickness of between about 200 nm and about 230 nm.

23. A method of fabricating an amorphous luminescent emitter layer as claimed in claim 16 wherein said transition metal luminescent center comprises Cu and said amorphous film is sputter deposited at a Cu Concentration of between about 0.1 and about 10 atomic percent.

24. A method of fabricating an amorphous luminescent emitter layer as claimed in claim 16 wherein said transition metal luminescent center comprises Cu and said amorphous film is sputter deposited at a Cu concentration of about 7.4 atomic percent.

25. A method of fabricating an amorphous luminescent emitter layer as claimed in claim 16 wherein said transition metal luminescent center comprises Mn and said amorphous film is sputter deposited at a Mn concentration of between about 0.1 and about 10 atomic percent.

26. A method of fabricating an amorphous luminescent emitter layer as claimed in claim 16 wherein said transition metal luminescent center comprises Mn and said amorphous film is sputter deposited at a Mn concentration of about 1.4 atomic percent.

27. A method of fabricating an amorphous luminescent emitter layer as claimed in claim 16 wherein said transition metal luminescent center comprises Cr and said amorphous film is sputter deposited at a Cr concentration of between about 0.1 and about 10 atomic percent.

28. A method of fabricating an amorphous luminescent emitter layer as claimed in claim 16 wherein said transition metal luminescent center comprises Cr and said amorphous film is sputter deposited at a Cr concentration of about 1.5 to about 3 atomic percent.

29. A method of fabricating an amorphous luminescent emitter layer as IC, claimed in claim 16 wherein said amorphous film is annealed at about 1250 to about 1300 K for up to 30 minutes.

30. A method of fabricating an alternating current thin film electroluminescent device by:
   preparing an amorphous film emitter layer comprising aluminum nitride and a rare earth luminescent Center by co-sputtering an Al target and a rare earth target in a nitrogenous atmosphere at room temperature under vacuum;
   positioning said emitter layer between a pair of electrode layers;
   connecting an AC power source across said pair of electrode layers, wherein said emitter layer and said pair of electrode layers are arranged such that, upon activation of said AC power Source, an electric field is created between said electrode layers across said emitter layer and wherein said aluminum nitride and said rare earth luminescent center are provided in proportions selected such that said electric field causes emission of visible light of said selected wavelength from said emitter layer.

31. A method of fabricating an alternating current thin film electroluminescent device as claimed in claim 30 wherein said emitter layer is prepared by maintaining said emitter layer near room temperature, whereby heated activation of said emitter layer is unnecessary.

32. A method of fabricating an alternating current thin film electroluminescent device as claimed in claim 30 wherein said emitter layer is co-sputtered over a substrate characterized by a melting point below 1000° C.

33. A method of fabricating alternating current thin film electroluminescent device as claimed in claim 30 wherein said emitter layer is co-sputtered over a substrate characterized by a melting point below 250° C.

34. A method of fabricating an alternating current thin film electroluminescent device as claimed in claim 30 wherein said emitter layer is co-sputtered over a substrate characterized by a melting point below 100° C.

35. A method of fabricating an alternating current thin film electroluminescent device as claimed in claim 30 wherein said emitter layer is co-sputtered over a plastic substrate.

36. A method of fabricating an amorphous luminescent emitter layer comprising aluminum nitride and a rare earth luminescent center by co-sputtering an Al target and a rare earth target over a deposition surface of a substrate so as to form an amorphous AlN:RE film emitter layer on said deposition surface, wherein said co-sputtering is performed in a nitrogenous atmosphere, at room temperature, under vacuum.

37. A method of fabricating an amorphous luminescent emitter layer as claimed in claim 36 wherein said emitter layer is prepared by maintaining said emitter layer near room temperature, whereby heated activation of said emitter layer is unnecessary.

38. A method of fabricating an amorphous luminescent emitter layer as claimed in claim 36 wherein said substrate is characterized by a melting point below 1000° C.

39. A method of fabricating an amorphous luminescent emitter layer as claimed in claim 36 wherein said substrate is characterized by a melting point below 250° C.

40. A method of fabricating an amorphous luminescent emitter layer as claimed in claim 36 wherein said substrate is characterized by a melting point below 100° C.

41. A method of fabricating an amorphous luminescent emitter layer as claimed in claim 36 wherein said substrate comprises a plastic substrate.

42. A method of fabricating an amorphous luminescent emitter layer as claimed in claim 36 wherein said rare earth luminescent center comprises Er.

43. A method of fabricating an amorphous luminescent emitter layer as claimed in claim 36 wherein said rare earth luminescent center comprises Tb.

44. A method of fabricating an amorphous luminescent emitter layer as claimed in claim 36 wherein said rare earth luminescent center comprises Nd.

45. A method of fabricating an amorphous luminescent emitter layer as claimed in claim 36 wherein said rare earth luminescent center comprises Eu.

* * * * *

UNITED STATES PATENT AND TRADEMARK OFFICE
CERTIFICATE OF CORRECTION

PATENT NO. : 6,689,630 B2
DATED : February 10, 2004
INVENTOR(S) : Kordesch et al.

It is certified that error appears in the above-identified patent and that said Letters Patent is hereby corrected as shown below:

Column 6,
Line 14, "Conned" should read as -- formed --
Line 19, "10008° C." should read as -- 1000° C. --

Column 7,
Line 1, "wit" should read as -- with --
Line 19, "Ton" should read as -- Torr --
Line 23, "RE" should read as -- RF --
Line 58, "claim 6", should read as -- claim 16 --
Line 67, "Ton" should read as -- Torr --

Column 8,
Line 16, "Concentration" should read as -- concentration --
Line 44, "IC" should read as -- as claimed --
Line 50, "Center" should read as -- center --

Signed and Sealed this

Twenty-seventh Day of July, 2004

JON W. DUDAS
*Acting Director of the United States Patent and Trademark Office*